UNITED STATES PATENT OFFICE.

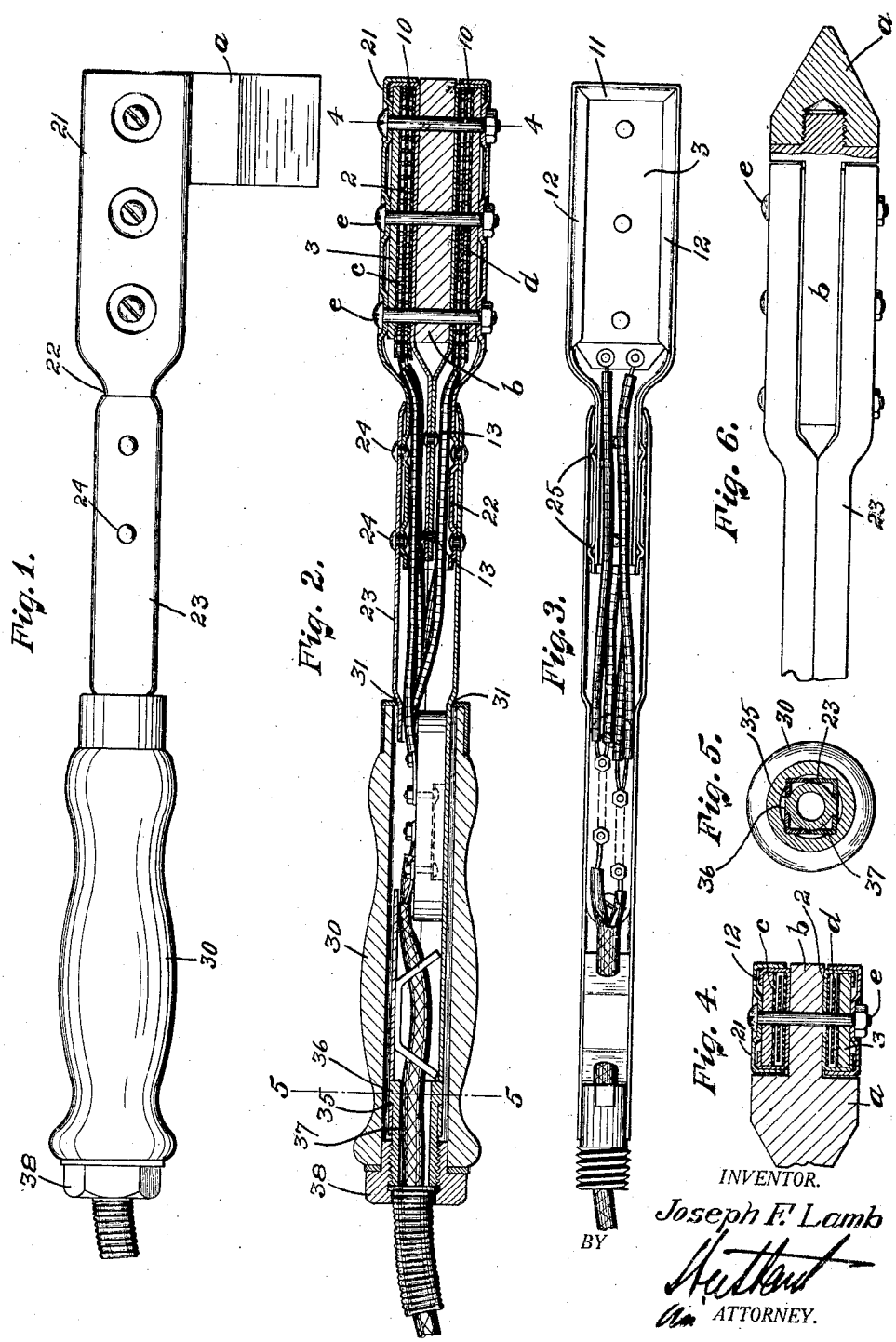

JOSEPH F. LAMB, OF NEW BRITAIN, CONNECTICUT, ASSIGNOR TO LANDERS, FRARY & CLARK, OF NEW BRITAIN, CONNECTICUT, A CORPORATION OF CONNECTICUT.

ELECTRICALLY-HEATED UTENSIL.

1,422,721.  Specification of Letters Patent.  Patented July 11, 1922.

Application filed August 18, 1919. Serial No. 318,188.

*To all whom it may concern:*

Be it known that I, JOSEPH F. LAMB, a citizen of the United States, and a resident of New Britain, in the county of Hartford, State of Connecticut, have invented certain new and useful Improvements in an Electrically-Heated Utensil, of which the following is a specification.

The objects of this invention are, generally, to increase the efficiency of electrically heated utensils of various sorts by securing a better contact between the heating element and that part of the utensil which is to be directly heated and to allow for ready removal of the part to be heated from the heating elements. The embodiment of the invention selected for illustration is a soldering iron, and there are certain features of invention which are peculiarly applicable to certain types of utensils, such for instance as the embodiment here selected for illustration and description, and other utensils which are to be manipulated by hand. However, I do not wish it to be understood that the inventions herein disclosed are limited in their application to the exact uses illustrated, described or referred to, as it will be obvious that they are adapted for general application.

Referring to the drawings—

Fig. 1 is a view in elevation of a soldering iron made in accordance with my invention.

Fig. 2 is a longitudinal sectional view thereof.

Fig. 3 is a view with the plates covering one side of the structure removed.

Fig. 4 is a sectional view on the line 4—4 of Fig. 2.

Fig. 5 is a sectional view on the line 5—5 of Fig. 2, and

Fig. 6 is a view of a modification.

Referring to the drawings in detail, $a$ denotes the copper point of a soldering iron having a stem $b$ of reduced size, preferably rectangular in cross section. $c$ denotes one heating element and $d$ another heating element, located, as will be seen, on opposite sides of the stem $b$, and clamped or secured thereon as by the bolts $e$. The heating elements, $c$, $d$, are enclosed in the metal plates 2, 3, as will be more clearly described hereinafter. Plates 2 are preferably of a non-corrosive metal, such as nickel or nichrome, and the plates 3 may be of iron. The point and its stem are usually of copper. If desired, the stem $b$ of the point may be nickel plated to prevent sticking between the stem and the plates 2 and also to protect the stem $b$ against the action of acids.

A material consideration of the present invention is that the part which is to be heated, in this case the point and its stem, shall be of metal which when heated expands more rapidly or to a greater extent than does the means for clamping the heating elements against the part to be heated. The efficiency of the transmission of heat from the heating elements to the part to be heated depends upon the contact between the parts, and by this arrangement the contact can originally be made firm and complete by clamping the elements to the part to be heated. During the use of the device the greater expansibility of the part to be heated insures the maintenance of this contact, the tendency being to ever keep this contact at the highest degree of efficiency. This means in this particular embodiment that since the heat is drawn away from the point, a flow of heat is set up from the elements into the point. It is of course true of a variety of utensils, such for instance as percolators, that the action is such as to produce this flow of heat, and the device becomes particularly efficient when, as here, provision is made for insuring a perfect contact between the part to be heated and the elements, the effect of the heating being to make this contact more perfect.

Each heating element as here illustrated is preferably flat, the resistor 10, properly insulated, being positioned between metal plates 2, 3, the end and sides of one plate, as 2, being folded over the other plate 3 as indicated at 11 and 12 respectively, to hold the parts of the heating element in assembled relation. In the illustrative embodiments shown in the drawings, the plates 2 are of channel shape and rearwardly of the shank $b$ their ends are offset towards each other and secured together in any suitable manner, as by rivets 13.

In the embodiment illustrated in Figs. 1 to 5 inclusive, each of the heating elements is fitted into the enlarged and recessed end of an enclosing plate 21. The rear ends of the enclosing plates are also of channel shape and are offset towards each other so as to receive and entirely enclose the rear offset ends of the plates 2. Where the securing bolts $e$, $e$, go through the enclosing plates 21, the plates are countersunk, with the result that air spaces are left between the plates 21 and the outer plates 3 of the heating elements, which provide an insulation useful in reducing the loss of heat. It will be seen from Fig. 2 that each of the plates 3 is of substantial thickness to provide a relatively large mass of metal in which the heat may be stored, and the heat so stored will flow towards the point $a$ should the temperature of the latter fall. The handle stem 23 may be formed of two channel shaped members placed edge to edge as will be clearly understood from Fig. 5. In Figs. 1 to 5 inclusive, the forward end of this stem receives the rearwardly extending ends 22 of the enclosing plates 21 and is secured thereto by means of rivets 24. The handle stem 23 or the ends 22 of the enclosing plates may be fluted (in the present instance the flutes 25 being illustrated on the ends 22) to provide air spaces to interrupt partly the communication of heat to the handle stem.

It will be seen that in order to remove one point and install another, it is only necessary to remove the bolts, $e$, $e$. The enlarged ends of the enclosing plates 21, together with the heating elements carried thereby, spring, or may be sprung, apart sufficiently to withdraw the used point and insert a new one, when the bolts can be replaced and the elements clamped down tightly on the stem $b$. Corrosion of the parts will not interfere with the ready removal of the stem of the point from between heating elements. In prior structures, where it has been usual to fit the stem in a socket, the action of acids or moisture results in corrosion causing the stem to stick so that it is very difficult to remove the stem.

30 denotes a handle, the bore of which is of a different cross section than the cross section of the handle stem 23. In the case shown the handle stem 23 is square, and the bore of the handle 30 is round, thus providing air insulation to prevent the overheating of the handle.

The handle stem is shouldered as at 31, 31, to provide stops which properly position the handle on the handle stem. The outer end of the handle stem is notched as at 35 to receive projections 36 on an externally threaded sleeve or bushing 37 to hold it against rotation, and this sleeve is engaged by a nut 38 at the outer end of the handle to securely tie the handle onto the handle stem. The leads for the heating elements pass through the handle as clearly indicated in the drawings. The two parts of the handle stem 23, together with the enclosing plates 21, which may be considered as parts or continuations of the handle stem since they are secured thereto, are separable when the handle 30 is removed and the bolts $e$, $e$ taken out, making it extremely convenient to get at the circuit connections.

In the embodiment illustrated in Fig. 6, instead of making the enclosing plates 21 and the parts of the handle stem 23 of separate pieces and then securing the parts together, the handle stem 23 is formed integral with the enclosing plates.

In that embodiment shown in Figs. 1 to 5, the soldering point $a$ is disclosed as extending at right angles from its stem or shank $b$ at a position between the ends of the heating units. This arrangement is of advantage as the point may be readily inserted into places which cannot easily be reached with an iron in which the point extends forwardly from the forward end of the stem, as shown in Fig. 6. Furthermore, it is unnecessary for the heat evolved in the heating elements to flow forwardly beyond the forward end of the heating elements before it reaches the heating point. It is, of course, evident that the soldering point may be integral with its stem as shown in Figs. 1 to 5 inclusive, or it may be detachably carried by the stem, as shown in Fig. 6.

It is to be understood that the invention is adapted for other uses than that of the embodiment selected for illustration.

In accordance with the provisions of the patent statutes I have described the principle of operation of my invention together with the apparatus which I now consider to represent the best embodiment thereof; but I desire to have it understood that the apparatus shown is only illustrative, and that the invention can be carried out by other means.

I claim as my invention:

1. In a utensil provided with a handle and handle stem fitting therein, a threaded member fitting within said handle stem and provided with projections entering notches in said handle stem in order to prevent relative rotation between the parts, and a second threaded member insertable in the outer end of said handle and engageable with said first threaded member.

2. In a utensil provided with a handle and a handle stem fitting therein, stops on said stem against which one end of the handle rests, a threaded member located within said handle stem and provided with projections entering notches in said stem to prevent relative rotation between the parts, and a flanged member engaging the outer end of said handle and threaded for engagement with said threaded member.

3. In an electrical utensil, a hollow handle stem formed in two longitudinal sections, a handle secured to one end of said stem holding the sections thereof in assembled relation, enlargements at the opposite ends of the sections of said handle stem, an electrical heating element mounted in the enlarged end of each section, separate circuit wires extending through said stem for each element, a heat-receiving member having a shank positioned between said elements, and means for clamping the ends of said stem and the elements against said heat-receiving member.

4. In an electrically heated device, a heating unit comprising a pair of plates one of which has its side edges folded about the other and a resistor between said plates, and a channel shaped enclosing plate receiving said heating unit.

5. In a soldering iron, a heating unit comprising a pair of plates and a resistor between said plates, one of said plates being of relatively large mass to function as a reservoir for heat, and a point having a stem secured to said heating unit and having heat conducting relation therewith.

6. In an electrically heated utensil, a pair of spaced heating units having channel shaped plates offset at one end and secured together, a handle stem comprising two opposed channel members having their forposed ward ends spaced apart and receiving said heating units, and a handle securing the members of said handle stem together.

7. In a device of the character described, a pair of electrical heating units, each enclosed and with its parts hold in assembled relation independently of other parts of the device, a handle supporting said units in spaced apart relation, and a part to be heated removably positioned between and held in heat conducting relation to said units.

8. In a device of the character described, a pair of independent enclosed electrical heating units, each unit including means for securing the parts together, a common handle supporting said units in spaced apart relation, a part to be heated removably positioned between and in heat conducting relation to said units, and means for clamping said part in position.

9. In a device of the character described, a pair of electrical heating units each including a pair of plates, a heating element positioned therebetween and insulated therefrom and means for securing the plates of each unit together; a common handle supporting said units in spaced relation, and a part to be heated removably positioned between said units.

10. In a device of the character described, a pair of members spaced apart at their forward ends and offset towards each other and connected at their rear ends, a heating element associated with the forward end of each member, a point having a stem positioned between said elements, and means for securing the forward ends of said members, said elements and said stem together.

11. In a device of the character described, a handle stem comprising a pair of members spaced apart at their forward ends and offset towards each other and connected at their rear ends, a self-contained heating unit removably associated with the forward end of each of said members, a part to be heated removably positioned between said units, and bolts for detachably securing together said members, units and parts.

12. In a device of the character described, a pair of sheet metal channel-shaped members spaced apart at their forward ends and offset towards each other and connected at their rear ends, a heating element within the forward end of each member, a point having a stem positioned between said elements, and means for securing the parts together.

13. In a device of the character described, a handle stem comprising two opposed channel-shaped members spaced apart at their forward ends and offset towards each other at their rear ends, a heating element removably associated with the forward end of each member, a point having a stem positioned between said elements, means for securing said elements and stem between the forward ends of said members, and a handle securing the parts of said handle stem together.

14. In a device of the character described, a pair of plate spaced apart at their forward ends and offset towards each other at their rear ends, a heating element associated with the forward end of each plate, a part to be heated positioned between said elements, a handle stem receiving the rear end of said plates, and flutes between said stem and plates providing air spaces therebetween for interrupting the communication of heat to said stem.

15. In a device of the character described, a pair of spaced heating units, a part to be heated positioned therebetween, an enclosing plate about each unit having bolt receiving openings the edges of which are countersunk to engage said heating units and provide air spaces between said plates and heating units, and bolts passing through said openings, units and part to be heated.

JOSEPH F. LAMB.